United States Patent Office 2,991,160
Patented July 4, 1961

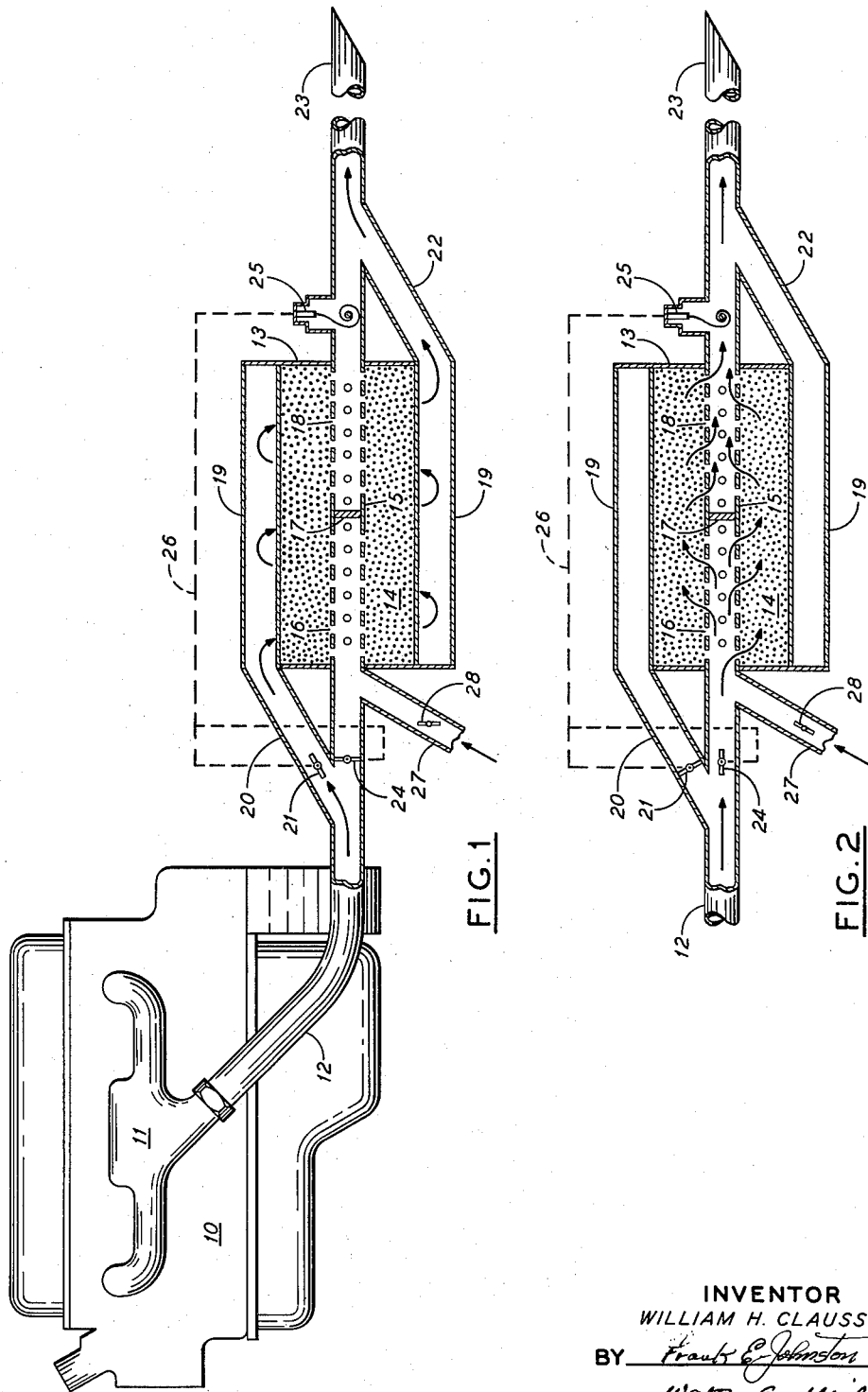
INVENTOR
WILLIAM H. CLAUSSEN
BY
ATTORNEYS

2,991,160
ENGINE EXHAUST GAS PURIFYING SYSTEM
William H. Claussen, Berkeley, Calif., assignor to California Research Corporation, San Francisco, Calif., a corporation of Delaware
Filed Mar. 19, 1958, Ser. No. 722,576
2 Claims. (Cl. 23—288)

This invention relates to a purifying system for the exhaust gases of internal combustion engines and particularly refers to a system and a mode of operation in which the gases are catalytically treated to complete the combustion of certain of their components, and has for its specific object the provision of means to prevent condensation of moisture on the catalyst employed for this purpose.

One of the most attractive methods of eliminating hydrocarbons from entering the atmosphere from the exhaust of automobiles is the catalytic afterburner. In the catalytic afterburner, hydrocarbons are converted by catalytic combustion into carbon monoxide or carbon dioxide and water.

When a cold engine is started, the catalyst mass in the afterburner is at ambient temperature and will condense liquid water from the exhaust gases until it has been heated to a temperature of well over 100° F. Some catalysts are sensitive to this liquid water condensation, and some of the chemicals used in the catalyst may be leached out by the action of the liquid water.

This invention comprehends broadly the provision of a temperature-responsive bypass arrangement for a catalytic afterburner or exhaust gas treater which will divert the cooler exhaust gases in the system during the warming-up period of the engine until the catalyst has attained a temperature at which moisture will not condense in it. This may also be described as the procedure for diverting the exhaust gas from such a catalytic treater until its temperature has been raised above the dew point of the gas under the conditions in the exhaust system.

Additionally, it is contemplated that air will be admitted to the catalyst during the warming-up procedure, as well as later, for reasons and under conditions which will be described in further detail below.

It is an object of this invention to provide a system for an exhaust gas catalytic treater which will prevent the flow of exhaust gas and the condensation of moisture within the treater until the catalyst therein has attained a temperature above the dew point of the exhaust gas.

Another object is to provide a device which will extend the life of a catalytic afterburner by preventing condensation of moisture therein when the engine is first started and the exhaust gases are below the dew point of the moisture contained therein.

Another object is to provide a simple and inexpensive attachment which may be adapted to the exhaust gas system of existing automotive equipment.

These and other objects and advantages will be further apparent from the attached drawing and from the following description.

In the drawing,

FIGURE 1 is a schematic illustration, partially in longitudinal vertical section, of a catalytic afterburner utilizing this invention during the period when heat is added to the catalyst and before exhaust gases are contacted with it.

FIGURE 2 is a longitudinal vertical sectional view of the afterburner and its accessory parts after the catalyst temperature has risen above the dew point of the moisture contained in the exhaust gases.

Referring to the drawing, reference numeral 10 designates generally an internal combustion engine suitable for automotive equipment such as trucks, buses, or the like, having an exhaust manifold 11 and an exhaust outlet conduit 12. At an appropriate location in conduit 12, a generally cylindrical metal chamber 13 is provided, adapted to contain a suitable pelleted or granular catalyst 14. A suitable catalyst for this purpose is that of the copending application of A.H. Batchelder and R. P. Sieg, assignors to the common assignee of this application, Serial No. 664,473, filed June 10, 1957, now Patent No. 2,942,933, entitled, "Oxidation of Exhaust Gases." A preferred embodiment is granulated activated alumina impregnated with potassium dichromate, dried and calcined at 1200° F.

In this example, a central conduit 15 extends throughout chamber 13 and is perforated as at 16 to permit gases from conduit 12 to escape into catalyst 14. A central barrier 17 intermediate the length of conduit 15 prevents the exhaust gases from traveling completely through the central conduit. A second set of perforations 18 permits the gas to leave the catalyst and reenter the central conduit 15 beyond barrier 17 and continue through the exhaust system to the atmosphere. Although a specific example of this catalyst chamber is illustrated, it is obvious that numerous modifications could be made to provide intimate contact of the gases with the catalyst in the chamber as they traverse it from its inlet to its outlet.

Surrounding chamber 13, in this case, is a heat transfer means, such as an annular jacket 19, which forms part of a bypass for the catalyst chamber. To convey gases from the exhaust conduit 12 to jacket 19, a branch inlet conduit 20 diverges as shown and is provided with a butterfly valve 21. At the opposite end of jacket 19 from the inlet conduit 20 is an outlet conduit 22 which conveys gases from jacket 19 to the tail pipe 23 of the exhaust gas system. Alternatively, outlet conduit 22 may open directly to the atmosphere.

In order to control selectively the diversion of exhaust gas into conduit 20 and jacket 19 or through catalyst chamber 13, a second butterfly valve 24 is positioned in conduit 12 beyond its juncture with the branch inlet conduit 20. In the outlet from the catalyst chamber, a temperature-responsive means, which may be a spiral bimetal element 25, is positioned to sense the temperature of any gases leaving the catalyst chamber 13, which will represent the temperature of the catalyst itself. A mechanical linkage generally designated 26 interconnects butterfly valves 21 and 24 with the temperature-responsive element 25. This is so arranged that as long as the temperature of gases leaving the catalyst chamber is below the dew point of the moisture contained therein, valve 21 will be open and valve 24 will be substantially closed, thus diverting substantially all of the exhaust gases through branch conduit 20, jacket 19 and outlet conduit 22 to the tail pipe 23 out of contact with the catalyst. When sufficient heat has been imparted to the catalyst to raise its temperature above the dew point of the gases, the temperature-responsive element 25 will reverse the position of valves 21 and 24 to those shown in FIGURE 2, so that substantially all of the exhaust gas will pass through the catalyst 14 and will be purified thereby.

Under certain circumstances, it is desirable to admit controlled quantities of atmospheric air to such a catalytic afterburner as is comprehended by this invention, and means such as inlet 27 controlled by a valve 28 may be provided for this purpose, so that the desired mixture of air and exhaust gases may be admitted into central conduit 15 to pass through catalyst 14 and be reacted therein. Various means for introducing the air into inlet 27 may be provided, such as the venturi throats, blowers, and other arrangements commonly used for this purpose. If desired, a small quantity of air may be admitted to inlet 27 during the warming-up period. As this air will contain less moisture than exhaust gases in conduit 12, it will not adversely affect the catalyst 14, and will also serve to transmit the attained temperature of the catalyst to the temperature-responsive element 25.

In conclusion, it will be appreciated that this invention comprehends broadly a method and means for improving the operation of a catalytic afterburner by diverting the exhaust gases around the catalyst therein until sufficient heat has been added to the catalyst by an indirect heat exchange means to raise its temperature above the dew point and thereby prevent moisture condensation in the catalyst body from the exhaust gases, which would adversely affect its operation and shorten its useful life.

Although a single example of such a system has been given, it is obvious that numerous changes could be made without departing from the invention, and all such modifications as are included within the scope of the appended claims are intended to be embraced thereby.

I claim:

1. An exhaust gas purifying system for an internal combustion engine, comprising a catalytic reaction chamber having an inlet and an outlet for exhaust gas, annular indirect heat-exchange means surrounding said catalytic reaction chamber for increasing the temperature of said catalyst, gas by-pass means for passing gas from said inlet through said annular heat-exchange means to said outlet without passing through said chamber, means for continuously supplying air into said catalyst chamber, and temperature-responsive means in said outlet for regulating the flow of said exhaust gas into said outlet such that at catalyst temperatures below the dew point of said gas under the conditions in said system the exhaust gas is diverted to said gas by-pass means and at temperatures above said dew point said gas is diverted into said chamber.

2. A system according to claim 1, in which said heat-exchange means comprises an exhaust gas jacket for said chamber.

References Cited in the file of this patent

UNITED STATES PATENTS

| | | |
|---|---|---|
| 1,875,024 | Kryzanowsky | Aug. 30, 1932 |
| 1,940,700 | Reihm | Dec. 26, 1933 |
| 2,071,119 | Harger | Feb. 16, 1937 |